F. BRAIS.
HAME FASTENER.
APPLICATION FILED JULY 21, 1913.

1,113,597.

Patented Oct. 13, 1914.

WITNESSES:
R. Hamilton
L. J. Fischer

INVENTOR:
Frederick Brais,
BY
F. G. Fischer,
ATTORNEY.

THE NORRIS PETERS CO., PHOTO-LITHO., WASHINGTON, D. C.

UNITED STATES PATENT OFFICE.

FREDERICK BRAIS, OF KANSAS CITY, MISSOURI.

HAME-FASTENER.

1,113,597. Specification of Letters Patent. Patented Oct. 13, 1914.

Application filed July 21, 1913. Serial No. 780,180.

*To all whom it may concern:*

Be it known that I, FREDERICK BRAIS, a citizen of the United States, residing at Kansas City, in the county of Jackson and State of Missouri, have invented certain new and useful Improvements in Hame-Fasteners, of which the following is a specification.

My invention relates to improvements in hame-fasteners, and my object is to produce a simple, inexpensive device of this character whereby hames may be tightly drawn into position against a collar and reliably held in such position until the hame-fastener is manually removed.

Figure 1:
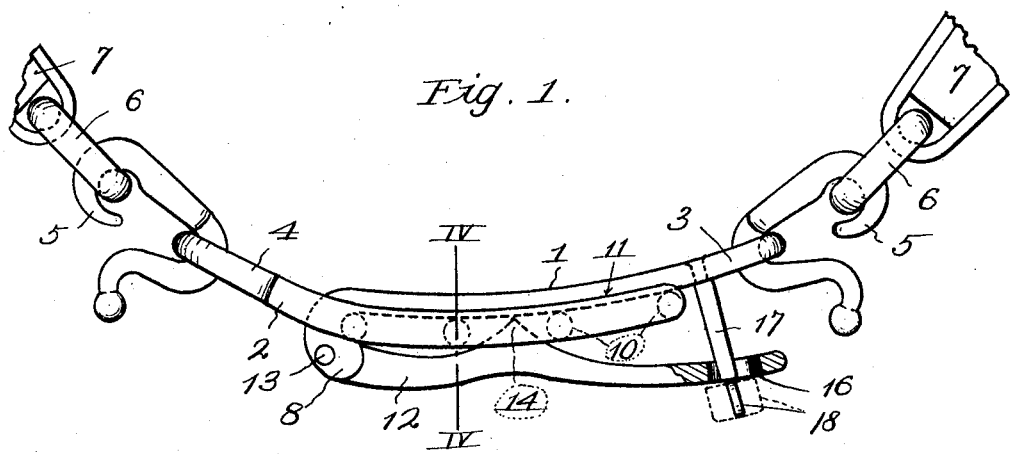
Figure 2:
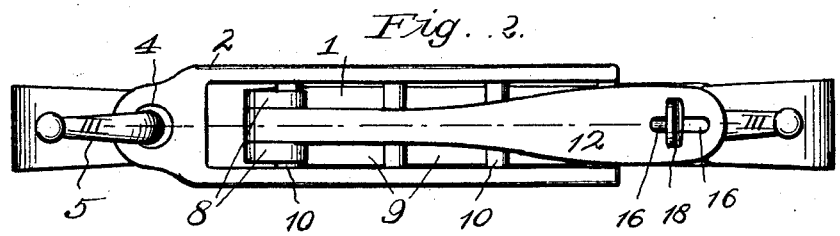
Figure 3:
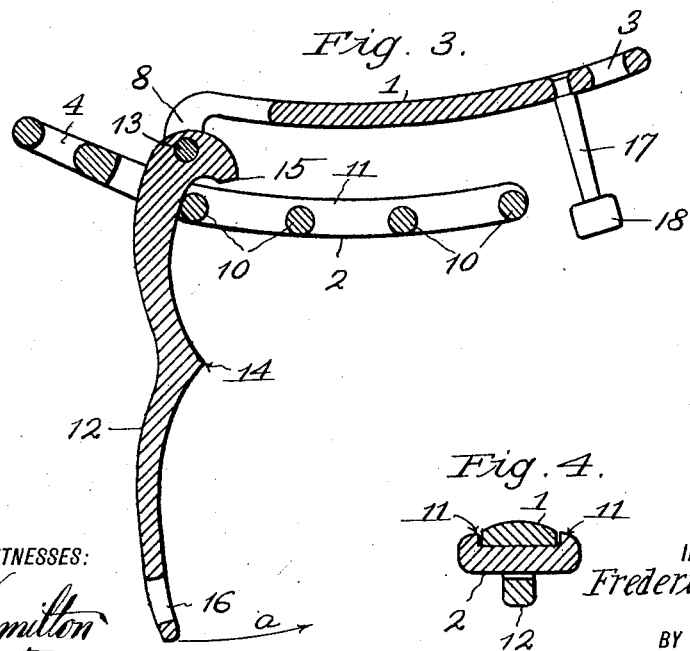
Figure 4:
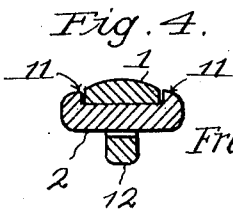

In order that the invention may be fully understood, reference will now be made to the accompanying drawing, in which:

Figure 1 is a side elevation of the hame-fastener in operative position, and connected to the lower ends of a pair of hames. Fig. 2 is an inverted plan view of the hame-fastener in closed position and removed from the hames. Fig. 3 is a section on line III—III of Fig. 2, of the hame-fastener in open position, and with two hooks thereof removed. Fig. 4 is a vertical cross section on line IV—IV of Fig. 1.

In carrying out the invention, I form the main body portion of the hame-fastener in two sections 1 and 2 adapted to lap each other, as shown on Fig. 1.

The outer ends of sections 1 and 2 have eyes 3 and 4, respectively, to receive two removable hooks, 5, adapted to engage links 6 connected to the lower terminals 7 of the hames.

The end of section 1 opposite its eye 3, is formed into a hook 8 adapted to extend through any one of a plurality of openings 9 in section 2, and engage any one of the transverse members 10 separating said opening 9 from each other. The transverse members 10 are so arranged that their upper surfaces do not come flush with the upper surfaces of section 2. Hence, the upper margins 11 of said section 2 extend upward at opposite sides of section 1 and prevent the same from moving laterally independently of section 2, when the two sections are placed together.

The hook 8 of section 1, is bifurcated to receive one end of a lever 12, fulcrumed upon a pin 13 extending through the bifurcated hook 8.

Lever 12 is curved longitudinally to approximately conform to the curvature of sections 1 and 2, and has an intermediate V-shaped reinforcement 14, adapted to enter any of the openings 9 and by contacting the two opposing transverse members 10 assist the hook 8 in holding section 2 in proper relation to section 1. Slight leeway is left between the diverging sides of the reinforcement 14 and the two opposing transverse members 10, as shown on Fig. 1, so that said lever can be readily forced to closed position without striking against said transverse members.

The pivotal end of lever 12 has a hook-shaped terminal 15 adapted to engage any one of the transverse members 10, and the free end of said lever has a slot 16 for the passage of a pin 17. Said pin 17 is swiveled at one end in the free end of section 1 and has a flat head 18 at its opposite end adapted to pass through the slot 16, and on being turned transversely to said slot, lock the lever 12 in closed position, as shown on Figs. 1 and 2.

In practice, the hame-fastener may be lengthened or shortened to suit the hames and the collar by placing the hook-shaped terminal 8 of section 1 and the lever 12 through the proper opening 9. This brings the lever 12 into engagement with one side of the adjacent member 10 at a point below the hook-shaped terminal 15, as shown on Fig. 3. Hence, when the lever 12 is swung upward as indicated by the arrow *a*, it will draw the sections 1 and 2 in opposite directions and thus cause them to draw the hames 7 firmly in position against the collar. The free end of the lever is then secured by passing its slotted portion over the head 18 of the pin 17, which is then turned a quarter of a revolution to bring said head transversely across the slot 16.

In order to prevent accidental disengagement of the slotted portion of lever 12 from head 18 should the latter be inadvertently left parallel with the slot 16, said head is so proportioned as to slightly overlap one end of the slot as shown by dotted lines, Fig. 1, and with this end in view pin 17 is formed of slightly resilient material so that it will spring toward the end of the slot just as soon as head 18 has passed therethrough.

While I have shown the preferred form of my hame-fastener I, of course, reserve the right to make such modifications as properly fall within the spirit and scope of the claim.

Having thus described my invention, what I claim and desire to secure by Letters Patent is:

A hame fastener, comprising in combination, a body portion having at one end thereof an eye adapted to receive a hook, and having a series of apertures in said body portion formed by transverse bars, a hook member comprising two legs each having a bend in one end thereof, said legs being pivoted together at their bended portions to form a hook adapted to be inserted through the apertures in said body portion and engage one of the said transverse bars, one of said legs having an aperture at the free end thereof, a pin mounted on the other of said legs, a button rotatably mounted on said pin, said button being adapted to extend through the aperture in said first mentioned leg and retain the said legs in spaced relation with respect to each other, and a projection carried by said first mentioned leg at a point midway between its extremities and adapted to extend between two of said transverse bars and above the other leg.

In testimony whereof I affix my signature, in the presence of two witnesses.

FREDERICK BRAIS.

Witnesses:
VOLNEY A. CARRINGER,
F. G. FISCHER.

Copies of this patent may be obtained for five cents each, by addressing the "Commissioner of Patents, Washington, D. C."